US008656275B2

(12) United States Patent
Bennett et al.

(10) Patent No.: US 8,656,275 B2
(45) Date of Patent: *Feb. 18, 2014

(54) MATCHING VARIOUS COMBINATIONS OF XPATH URIS TO THE SAME XML NODE

(75) Inventors: Valerie M. Bennett, Durham, NC (US);
Benson K. Chen, Durham, NC (US);
Stephen M. Hinton, Durham, NC (US);
Douglas S. Williams, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,800

(22) Filed: Feb. 28, 2012

(65) Prior Publication Data

US 2012/0158697 A1 Jun. 21, 2012

Related U.S. Application Data

(62) Division of application No. 12/651,312, filed on Dec. 31, 2009.

(51) Int. Cl.
*G06F 17/00* (2006.01)

(52) U.S. Cl.
USPC .................................. 715/234; 707/999.102

(58) Field of Classification Search
CPC ....................................................... G06F 17/00
USPC .................................. 715/234; 707/999.102
See application file for complete search history.

(56) References Cited

U.S. PATENT DOCUMENTS

| 8,250,093 | B2 * | 8/2012 | Van der Linden | 707/781 |
| 2005/0091587 | A1 * | 4/2005 | Ramarao et al. | 715/522 |
| 2006/0005203 | A1 * | 1/2006 | Menten | 719/313 |
| 2007/0208769 | A1 * | 9/2007 | Boehm et al. | 707/102 |
| 2008/0104124 | A1 * | 5/2008 | Bao et al. | 707/104.1 |
| 2008/0235258 | A1 * | 9/2008 | Chung et al. | 707/102 |
| 2009/0063951 | A1 * | 3/2009 | Rjaibi et al. | 715/234 |

* cited by examiner

*Primary Examiner* — Stephen Hong
*Assistant Examiner* — Ahamed I Nazar
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to subscribing and updating nodes within XML documents and provide a novel and non-obvious method, system and computer program product for matching various combinations of XML Path Language (XPATH) Uniform Resource Identifiers (URIs). In one embodiment of the invention, a method for matching various combinations of XML Path Language (XPATH) Uniform Resource Identifiers (URIs) that includes receiving a XPATH expression for a node in an XML document, retrieving the node identified by the XPATH expression, determining if a template exists for the identified node, where the template resides in a database of a document management system, comparing the template expression to the XPATH expression and determining if the expressions match. The method can further include modifying the XPATH expression to account for a dominant attribute required by the template when the XPATH expression does not match the template expression and returning the modified XPATH expression.

5 Claims, 2 Drawing Sheets

MATCHING VARIOUS COMBINATIONS OF XPATH URIS TO THE SAME XML NODE

CROSS-REFERENCE TO RELATED APPLICATIONS

This application is a Divisional of U.S. application Ser. No. 12/651,312, filed Dec. 31, 2009, currently pending, the entirety of which is incorporated herein by reference.

BACKGROUND OF THE INVENTION

1. Field of the Invention

The present invention relates to subscribing and updating nodes within XML documents and more particularly to matching various combinations of XPATH URIs to the same XML node.

2. Description of the Related Art

In an Extensible Markup Language (XML) Document Management Server (XDMS), users are allowed to subscribe to and update nodes within XML documents by specifying an XML Path Language (XPATH) Uniform Resource Identifier (URI) to that node. A node element can be specified by using any of the element's attributes or the element's particular index within its parent element. Having so many ways to specify an element is a problem. For instance, when a user is subscribed to a particular node using one attribute or index, and a change is made to the same node with a XPATH specified using a different attribute or index.

In addition, the use of specificity of a node (or lack thereof) also creates a problem in creating authorization policies at the node level. The same matching needs to be done to find the correct authorization policies before making changes to an element.

BRIEF SUMMARY OF THE INVENTION

Embodiments of the present invention address deficiencies of the art in respect to subscribing and updating nodes within XML documents and provide a novel and non-obvious method, system and computer program product for matching various combinations of XML Path Language (XPATH) Uniform Resource Identifiers (URIs). In one embodiment of the invention, a method for matching various combinations of XML Path Language (XPATH) Uniform Resource Identifiers (URIs) that includes receiving a XPATH expression for a node in an XML document, retrieving the node identified by the XPATH expression, determining if a template exists for the identified node, where the template resides in a database of a document management system, comparing the template expression to the XPATH expression and determining if the expressions match. The method can further include modifying the XPATH expression to account for a dominant attribute required by the template when the XPATH expression does not match the template expression and returning the modified XPATH expression.

In one aspect of the embodiment, comparing the template expression to the XPATH expression and determining if the expressions match includes identifying a node level constraint element in the XPATH expression, determining if a template exists for the identified node level constraint element in the XPATH expression where the template resides in a database of a document management system, retrieving the node when the template for the identified node level constraint element exists and comparing the node to the existing template and determining if the node matches the existing template. In another aspect of the embodiment, the method further can include comparing each level of the node to the node level constraint element in the template when the node does not match the existing template, determining if one of the node level constraint elements matches to the next to last level of the node level constraint element, retrieving the XML document from the database of the document management system when the XPATH expression is one element more shallow than the node level constraint element, retrieving an attribute defined in the node level constraint element and returning the node level constraint element with the attribute defined in the node level constraint element.

In another embodiment of the invention, a data processing system for matching various combinations of XML Path Language (XPATH) Uniform Resource Identifiers (URIs) can be provided. The data processing system can include an XML document management (XDM) server configured for communicative coupling to one or more clients over a computer communications network, an XDM system configured for accessing and manipulating XML documents stored in networked storage and transform node element logic comprising program code enabled to receive a XPATH expression for a node in an XML document, to retrieve the node identified by the XPATH expression, to determine if a template exists for the identified node, where the template residing in a database of a document management system, to compare the template expression to the XPATH expression, to determine if the expressions match, to modify the XPATH expression to account for a dominant attribute required by the template when the XPATH expression does not match the template expression and to return the modified XPATH expression.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
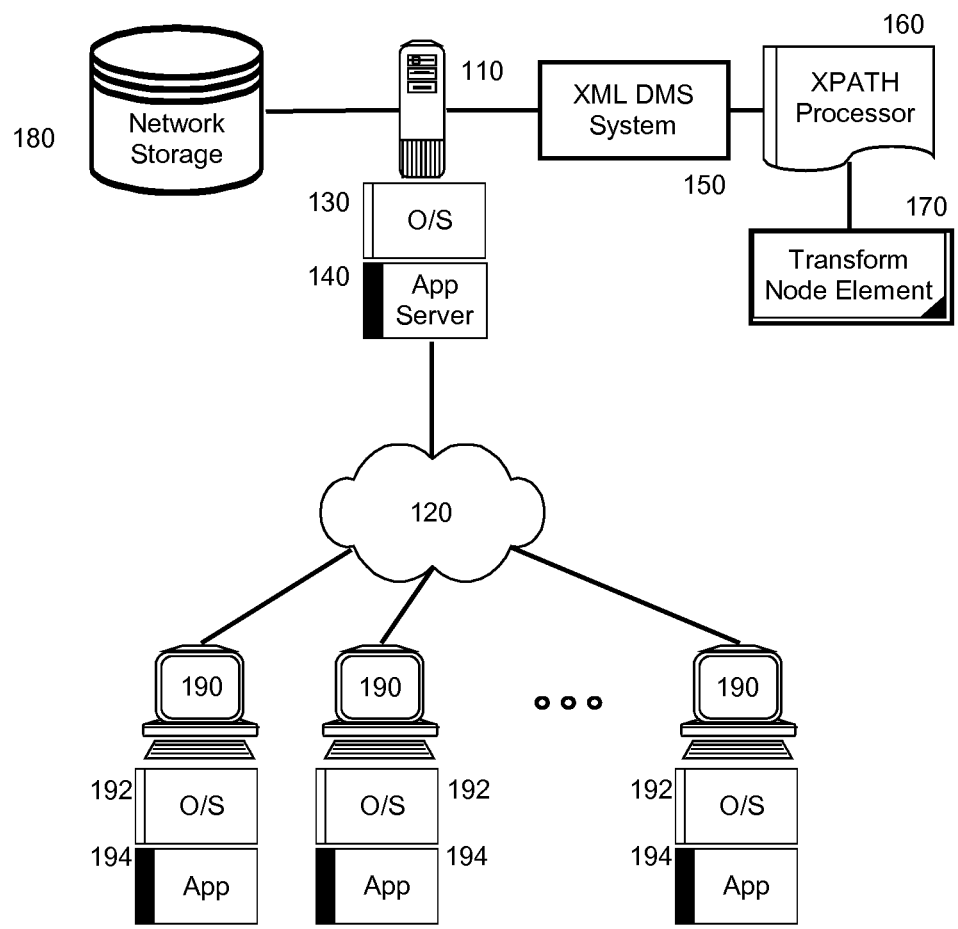
FIG. 1 is a schematic illustration of an data processing system for matching various combinations of XML Path Language (XPATH) Uniform Resource Identifiers (URIs); and, FIG. 2 is a flow chart illustrating a process for data processing system for matching various combinations of XML Path Language (XPATH) Uniform Resource Identifiers (URIs).

Embodiments of the present invention provide a method, system and computer program product for matching various combinations of XML Path Language (XPATH) Uniform Resource Identifiers (URIs). In accordance with an embodiment of the present invention, The data processing system can include an XML document management (XDM) server configured for communicative coupling to one or more clients over a computer communications network, an XDM system configured for accessing and manipulating XML documents stored in networked storage and transform node element logic comprising program code enabled to receive a XPATH expression for a node in an XML document, to retrieve the node identified by the XPATH expression, to determine if a template exists for the identified node, where the template residing in a database of a document management system, to compare the template expression to the XPATH expression, to determine if the expressions match, to modify the XPATH expression to account for a dominant attribute required by the template when the XPATH expression does not match the template expression and to return the modified XPATH expression.

In another embodiment of the invention, a method for matching various combinations of XML Path Language (XPATH) Uniform Resource Identifiers (URIs) that includes receiving a XPATH expression for a node in an XML document, retrieving the node identified by the XPATH expression, determining if a template exists for the identified node, where the template residing in a database of a document management system, comparing the template expression to the XPATH expression and determining if the expressions match. The method can further include modifying the XPATH expression to account for a dominant attribute required by the template when the XPATH expression does not match the template expression and returning the modified XPATH expression.

In another aspect of the embodiment, comparing the template expression to the XPATH expression and determining if the expressions match includes identifying a node level constraint element in the XPATH expression, determining if a template exists for the identified node level constraint element in the XPATH expression where the template resides in a database of a document management system, retrieving the node when the template for the identified node level constraint element exists and comparing the node to the existing template and determining if the node matches the existing template. In another aspect of the embodiment, the method further can include comparing each level of the node to the node level constraint element in the template when the node does not match the existing template, determining if one of the node level constraint elements matches to the next to last level of the node level constraint element, retrieving the XML document from the database of the document management system when the XPATH expression is one element more shallow than the node level constraint element, retrieving an attribute defined in the node level constraint element and returning the node level constraint element with the attribute defined in the node level constraint element.

In further illustration, FIG. 1 is a schematic illustration of a data processing system for matching various combinations of XML Path Language (XPATH) Uniform Resource Identifiers (URIs). The data processing system can include a XML Document Management (XDM) Server 110 communicatively coupled to one or more clients 190 over a computer communications network 120. The XDM Server 110 can support the operation of a XDM system 150 accessing and manipulating XML documents stored in network storage 180. The XDM Server 110 can include an operating environment 130, for example a virtual machine or operating system. The operating environment 130 further can support the operation of one or more end user applications 194, for example a word processor, spreadsheet, database application, Web browser and the like. Notably only a single end user application 194 is shown in FIG. 1 for the purpose of illustrative simplicity. In accordance with an embodiment of the invention, transform node element logic 170 can be coupled to or incorporated as part of the end-user application 194. For instance, provided and an application server 140 to support a wide range of application usages (e.g., different XML document types).

Notably, an XPATH processor 160 can be communicatively coupled to the XDM system 150 and the transform node element logic 170. The transform node element logic 170 can include program code enabled to receive an XPATH expression for a node in an XML document, retrieve the node identified by the XPATH expression and determine if a template exists for the identified node. The transform node element logic 170 further can include program code enabled to compare the template expression to the XPATH expression and determine if the expressions match. If the XPATH expression does not match the template expression, the XPATH expression is modified or transformed to account for the dominant attribute required by the template. Subsequently, the transformed XPATH expression is returned, which can be used to retrieve authentication and/or security rules for accessing the node.

In order to match XPATH URIs, a template needs to be developed for any document type stored within an XDM. An example template is shown below. The format of the template can take on various formats as is known to one of skill in the art.

An example template is shown below:

```
<nodeLevelConstraints>
    <nodeLevelConstraint>
        root/ns1:foo[@att1="$1"]?xmlns(ns1=...)
    </nodeLevelConstraint>
    <nodeLevelConstraint>
        root/ns2:foo[@att2="$1"]?xmlns(ns2=...)
    </nodeLevelConstraint>
    <nodeLevelConstraint>
        root/ns2:bar[@att3="$1"]?xmlns(ns2=...)
    </nodeLevelConstraint>
</nodeLevelConstraints>
```

Note that the template shows three possible elements that could be children of the root element. These elements are <foo> from namespace ns1, <foo> from namespace ns2, and <bar> from namespace ns2. The attribute "att1" is specified to be the dominant attribute for the <foo> element of ns1. This attribute will be used in all comparisons of <foo> in ns1. The attributes "att2" and "att3" are specified for the other elements. The "$1" is used as a special character to hold the place of the value for the dominant attribute.

Figure 2:
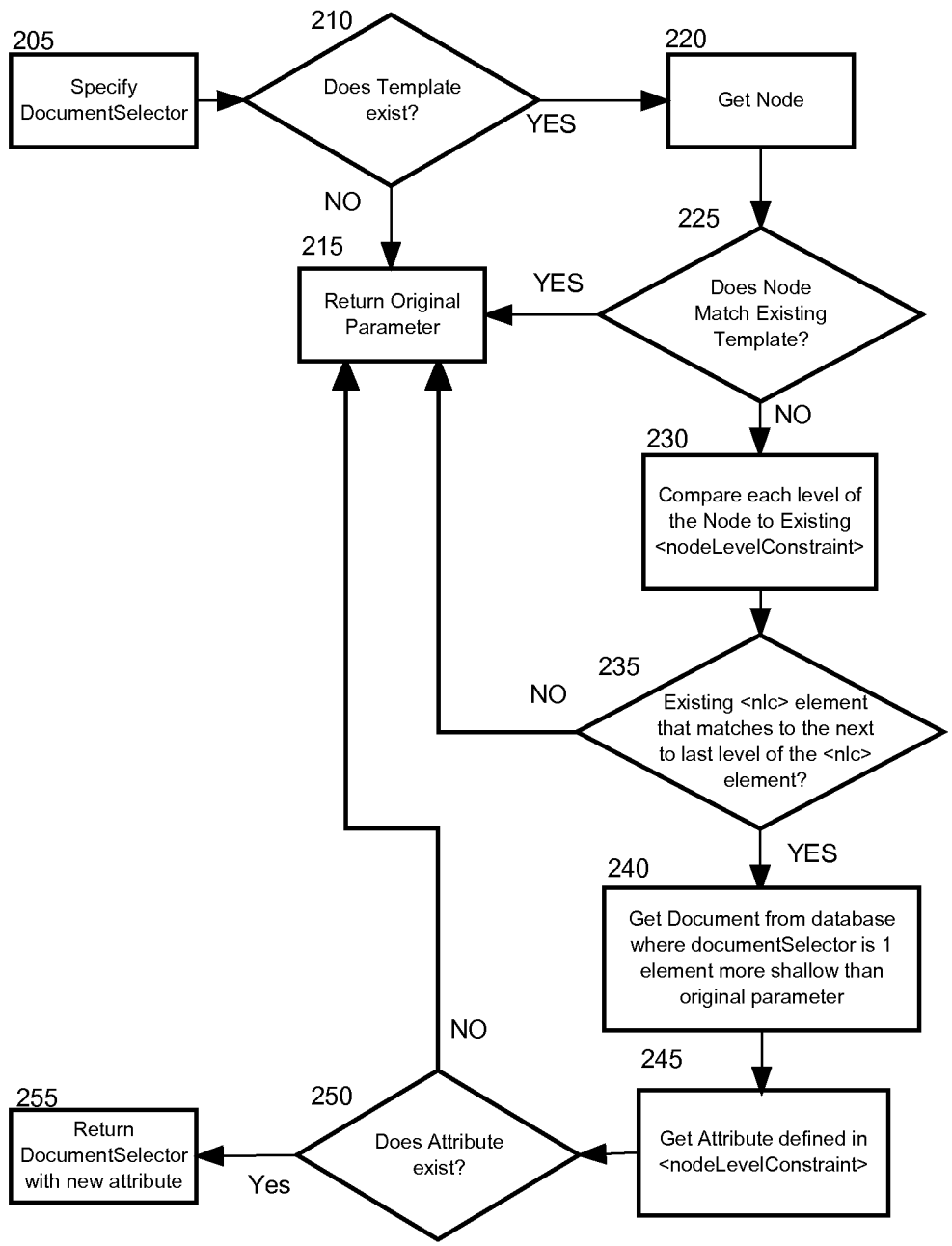

In further illustration, FIG. 2 is a flow chart illustrating a process for matching various combinations of XML Path Language (XPATH) Uniform Resource Identifiers (URIs). In one embodiment of the invention, a method for matching various combinations of XML Path Language (XPATH) Uniform Resource Identifiers (URIs) that includes in block 205, a XPATH expression for a node in an XML document can be received and in decision block 210, a determination if a template exists for the identified node, and where the template resides in a database of a document management system. If no template exists, then the attribute specified in the received XPATH expression is returned. On the other hand, if a template exists, then in block 220, the node identified by the XPATH expression is returned and compared to the existing template in block 225. In block 230, when the node does not match the existing template, each level of the node can be compared to the node level constraint element in the template. In decision block 235, a determination can be made of whether one of the node level constraint elements matches to the next to last level of the node level constraint element, and if so, then in block 240, an XML document can be retrieved from the database of the document management system dependent upon the XPATH expression being one element more shallow than the node level constraint element. In block 245, a dominate attribute defined in the node level constraint element can be identified if this attribute exists in decision block 250, the XPATH expression can be modified with the dominant attribute required by the template when the XPATH expression does not match the template expression. In block 255, the modified XPATH expression can be returned.

The following illustrative example is provided to more fully discuss the process for matching various combinations of XML Path Language (XPATH) Uniform Resource Identifiers (URIs) of FIG. 2. XML documents by nature can be quite complex. They contain a hierarchy of elements described by one or many attributes. XPATH is a way of describing a path to a target element within the XML hierarchy. For XDMS technologies, the XPATH used, also known as a NodeSelector, is very basic in nature. A program can use it to describe a path to a target element using one set of attributes. However, another program can target the same element but the XPATH uses entirely different attributes for the same elements along the path As illustration, consider the following sample XML document:

```
<root>
    <ns1:foo attr1="A" attr2="001">
        <ns1:bar attr3="+A" attr4="+1"/>
            <ns1:baz attr5="A %" attr6="1%"/>
    </ns1:foo>
    <ns1:foo attr1="B" attr2="002">
        <ns1:bar attr3="+B" attr4="+2"/>
            <ns1:baz attr5="B %" attr6="2%"/>
    </ns1:foo>
</root>
```

Each of the elements <ns1:foo>, <ns1:bar>, <ns1:baz> contain two attributes. For each pair of attributes, either one of the attributes can be used to identify an element. Therefore, the following are the different combinations of attributes used to uniquely define an XPATH to the same <ns1:bar> element:

1. root/ns1:foo[@attr1="A"]/ns1:bar[@attr3="+A"]
2. root/ns1:foo[@attr2="001"]/ns1:bar[@attr4="+1"]
3. root/ns1:foo[@attr1="A"]/ns1:bar[@attr4="+1"]
4. root/ns1:foo[@attr2="001"]/ns1:bar[@attr3="+A"]

Here, we note that different combinations of attributes are used. All different combinations of attributes are valid and target the same element. The problem is compounded by more attributes allowed and the deeper the nested elements. This invention resolves the problem of how you can efficiently compare two XPATHs that use different attributes yet determine equality without having to resolve both XPATHs to find the target node. In this case, a string comparison is a less costly function than XML traversal especially for large XML documents or for large number of XPATHs to compare. Accordingly, the process for matching various combinations of XML Path Language (XPATH) Uniform Resource Identifiers (URIs) of FIG. 2 reduces all XPATHs to a common denominator. By enforcing one XPATH as being the primary common denominator, it is a matter of converting all other XPATHs to this PRIMARY XPATH. In this embodiment, the NodeLevelConstraint provides for constraining a node to one XPATH.

For example, assume that there are certain patterns where Program1 is interested in examining changes, access, or effects of a node specified by an XPATH. Subsequently, Program2 attempts to change, access, or affect a node specified by another XPATH to the same node. The XDMS enforces Program1 to use a PRIMARY XPATH. Program2 can then use any XPATH and the XDMS will be able to map that XPATH to that of the PRIMARY XPATH to determine equality.

Continuing the example from above, assume that the first XPATH in the list is designated the PRIMARY XPATH (NodeLevelConstraint). Accordingly, the primary attribute of <ns1:foo> will be attr1 with any value of "XXX" and the primary attribute of <ns1:bar> will be attr3 with any value of "YYY".

root/ns1:foo[@attr1="XXX"]/ns1:bar[@attr3="YYY"]

Program1 will indicate interest with the first <ns1:bar> element by using this PRIMARY XPATH which is enforced by the XDMS. In this case it is:

root/ns1:foo[@attr1="A"]/ns1:bar[@attr3="+A"]

Program2 can use any XPATH it chooses to target the <ns1:bar> element. By using the process for matching various combinations of XML Path Language (XPATH) Uniform Resource Identifiers (URIs) of FIG. 2, the XPATH is transformed to that of the PRIMARY XPATH for string comparison.

Referring back to the same example, suppose that Program1 is interested in any change, access, or affect on a node or any sibling element. Now assume Program2 modifies the first <ns1:baz> element which is a sibling of the <ns1:bar> element that Program1 is interested in:

root/ns1:foo[@attr2="001"]/ns1:bar[@attr4="+1"]/ns1:baz[@att6="1%"]

The XML element that corresponds to the previous XPATH is:

<ns1:baz attr5="A %"attr6="1%"/>

Note that the attributes used by Program2 are not of the PRIMARY XPATH. Instead, Program2 uses attr2 for <ns1:foo> and attr4 for <ns1:bar>. According to the PRIMARY XPATH, these must be converted to attr1 for <ns1:foo> and attr3 for <ns1:bar>. If only the <ns1:baz> element is provided by Program2, then the XDMS must retrieve the FULL XML document from the database in order to examine the parent elements <ns1:foo> and <ns1:bar> and retrieve their corresponding attr1 for <ns1:foo> and attr3 for <ns1:bar>. Once done, the converted XPATH to the PRIMARY XPATH is thus:

root/ns1:foo[@attr1="A"]/ns1:bar[@attr3="+A"]/ns1:baz[@attr6="1%"]

Since Program1 is subscribed to:

root/ns1:foo[@attr1="A"]/ns1:bar[@attr3="+A"]

Now a string comparison can be run to determine if the prefix or the beginning portion of the XPATH string matches. As illustrated here, the prefix portion of the XPATH does indeed match.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible

We claimed is:

1. A method for matching various combinations of XML Path Language (XPATH) Uniform Resource Identifiers (URIs), the method comprising:
   receiving a XPATH expression for a node in an XML document;
   retrieving the node identified by the XPATH expression,
   determining if a template exists for the identified node, the template residing in a database of a document management system,
   comparing the template expression to the XPATH expression, and
   determining if the expressions match,
   when the XPATH expression does not match the template expression, modifying the XPATH expression to account for a dominant attribute required by the template and
   returning the modified XPATH expression.

2. The method of claim 1, wherein the comparing the template expression to the XPATH expression and determining if the expressions match comprises:
   identifying a node level constraint element in the XPATH expression;
   determining if a template exists for the identified node level constraint element in the XPATH expression, the template residing in a database of a document management system;
   retrieving the node when the template for the identified node level constraint element exists; and,
   comparing the node to the existing template and determining if the node matches the existing template.

3. The method of claim 2 further comprising:
   when the node does not match the existing template, comparing each level of the node to the node level constraint element in the template;
   determining if one of the node level constraint elements matches to the next to last level of the node level constraint element;
   retrieving the XML document from the database of the document management system when the XPATH expression is one element more shallow than the node level constraint element;
   retrieving an attribute defined in the node level constraint element; and,
   returning the node level constraint element with the attribute defined in the node level constraint element.

4. The method of claim 1, further comprising:
   retrieving authentication rules for accessing the node.

5. The method of claim 1, further comprising:
   notifying subscribers to the node of a change in the XML document.

* * * * *